(12) United States Patent
Togano et al.

(10) Patent No.: US 11,391,495 B2
(45) Date of Patent: Jul. 19, 2022

(54) TURBO REFRIGERATOR AND STARTUP CONTROL METHOD THEREFOR

(71) Applicant: MITSUBISHI HEAVY INDUSTRIES THERMAL SYSTEMS, LTD., Tokyo (JP)

(72) Inventors: Yoshie Togano, Tokyo (JP); Kenji Ueda, Tokyo (JP); Yasushi Hasegawa, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 121 days.

(21) Appl. No.: 16/754,280

(22) PCT Filed: Oct. 12, 2018

(86) PCT No.: PCT/JP2018/038158
§ 371 (c)(1),
(2) Date: Apr. 7, 2020

(87) PCT Pub. No.: WO2019/074108
PCT Pub. Date: Apr. 18, 2019

(65) Prior Publication Data
US 2021/0190394 A1    Jun. 24, 2021

(30) Foreign Application Priority Data

Oct. 12, 2017    (JP) .............................. JP2017-198521

(51) Int. Cl.
*F25B 31/00*    (2006.01)
*F25B 49/02*    (2006.01)
(Continued)

(52) U.S. Cl.
CPC ............ *F25B 31/004* (2013.01); *F04B 49/02* (2013.01); *F25B 1/053* (2013.01); *F25B 49/022* (2013.01);
(Continued)

(58) Field of Classification Search
None
See application file for complete search history.

(56) References Cited

U.S. PATENT DOCUMENTS

| 5,782,098 A * | 7/1998 | Hirooka ................. H02H 11/00 |
| | | 62/126 |
| 2013/0047635 A1* | 2/2013 | Shultz ..................... F25B 45/00 |
| | | 62/77 |
| 2019/0128580 A1 | 5/2019 | Suemitsu et al. |

FOREIGN PATENT DOCUMENTS

| JP | 53-116849 U | 9/1978 |
| JP | 60-18293 U | 2/1985 |

(Continued)

OTHER PUBLICATIONS

International Search Report issued in PCT/JP2018/038158 (PCT/ISA/210), dated Dec. 18, 2018.
(Continued)

*Primary Examiner* — Jerry-Daryl Fletcher
*Assistant Examiner* — Daniel C Comings
(74) *Attorney, Agent, or Firm* — Birch, Stewart, Kolasch & Birch, LLP (57) ABSTRACT

In order to reduce the effect on a compressor caused by foaming in an oil tank, a control unit for controlling an oil pump starts the oil pump before a compressor is started (SA1), starts the compressor (SA4) when an oil supply differential pressure P satisfies a compressor startup condition during a reference time Tas from the starting of the oil pump ("Yes" in SA3), and extends the operation of the oil (Continued)

pump for a prescribed time without starting the compressor (Step SA5) when the compressor startup condition is not satisfied ("No" in SA3).

10 Claims, 4 Drawing Sheets

(51) Int. Cl.
    *F04B 49/02*     (2006.01)
    *F04B 39/02*     (2006.01)
    *F25B 1/053*     (2006.01)

(52) U.S. Cl.
    CPC ....... *F04B 39/0207* (2013.01); *F25B 2500/16* (2013.01); *F25B 2500/26* (2013.01); *F25B 2600/23* (2013.01)

(56) References Cited

FOREIGN PATENT DOCUMENTS

| | | | |
|---|---|---|---|
| JP | 60-83873 | U | 6/1985 |
| JP | 5-3859 | U | 1/1993 |
| JP | 5-26190 | A | 2/1993 |
| JP | 6-24740 | Y2 | 6/1994 |
| JP | 6-341720 | A | 12/1994 |
| JP | 7-218010 | A | 8/1995 |
| JP | 2000-292017 | A | 10/2000 |
| JP | 2009-186030 | A | 8/2009 |
| JP | 2014-190627 | A | 10/2014 |
| JP | 2017-215085 | A | 12/2017 |

OTHER PUBLICATIONS

Written Opinion of the International Searching Authority issued in PCT/JP2018/038158 (PCT/ISA/237), dated Dec. 18, 2018.

\* cited by examiner

TURBO REFRIGERATOR AND STARTUP CONTROL METHOD THEREFOR

TECHNICAL FIELD

The present invention relates to a centrifugal chiller having an oil tank which stores a lubricant supplied to a turbo compressor and a startup control method therefor.

BACKGROUND ART

In the related art, an HFC refrigerant used for a centrifugal chiller has a Global Warming Potential (GWP) value in the hundreds to thousands, and thus, it is necessary to switch from the HFO refrigerant having a GWP value in the hundreds to thousands of GWP to an HFO refrigerant having a GWP value of one digit in consideration of an environment. In order to cope with this, a low-pressure refrigerant such as HFO-1233zd (E) may be used as a refrigerant for a chiller.

In general, the centrifugal chiller has an oil tank in which a lubricant supplied to the turbo compressor is stored. For example, the oil tank is equalized to a low-pressure side (evaporator side) of the centrifugal chiller, and thus, a pressure in the oil tank is changed according to an operation state of the chiller. In general, a gas density of the low-pressure refrigerant is lower than that of a high-pressure refrigerant. Accordingly, compared to a chiller which uses a high-pressure refrigerant, in a chiller which uses a low-pressure refrigerant, in a case where a pressure of the refrigerant having the same mass dissolved into the lubricant in the oil tank decreases and the refrigerant evaporates, a volume of the evaporated refrigerant increases, and foaming easily occurs in the lubricant in the oil tank. In particular, at the time of startup where a pressure reduction speed on a low-pressure side is large, foaming easily occurs in the lubricant in the oil tank.

PTL 1 discloses that when a compressor starts, after the starting is performed at an opening degree at which an opening degree of a suction capacity control unit is smaller than a target opening degree, the opening degree rapidly increases to the target opening degree such that an operation time in which the opening degree is less than the target opening degree can be set as short as possible to reduce a passage resistance of the refrigerant, and a decrease in a pressure on a downstream side of the suction capacity control unit is suppressed so as to suppress the occurrence of foaming.

CITATION LIST

Patent Literature

[PTL 1] Japanese Unexamined Patent Application Publication No. 2009-186030

SUMMARY OF INVENTION

Technical Problem

If foaming occurs, a lubricant in an oil tank is pushed up, the lubricant enters an evaporator through a pressure equalizing pipe, and thus, there is a concern that performance of the evaporator may be reduced. Moreover, if the foaming occurs, a refrigerant gas is caught in an oil pump, a predetermined amount of oil cannot be supplied to a compressor bearing, and thus, the compressor is likely to be damaged.

An object of an aspect of the present invention is to provide a centrifugal chiller and a startup control method therefor capable of reducing an influence on the compressor due to occurrence of the foaming in the oil tank.

Solution to Problem

According to a first aspect of the present invention, there is provided a centrifugal chiller including: a compressor which compresses a refrigerant; a condenser which condenses the refrigerant compressed by the compressor; an expansion valve which expands a liquid refrigerant introduced from the condenser; an evaporator which evaporates the refrigerant expanded by the expansion valve; an oil tank which stores a lubricant to be supplied to the compressor; an oil pump which supplies the lubricant in the oil tank to the compressor; and a control unit which controls the oil pump, in which the control unit starts the oil pump before the compressor starts, and when a reference period elapses from the startup of the oil pump, the control unit starts the compressor in a case where an oil supply differential pressure which is a differential pressure between an inlet-side pressure of the compressor and a pressure in the oil tank satisfies a compressor startup condition and extends an operation of the oil pump for a predetermined period without starting the compressor in a case where the oil supply differential pressure does not satisfy the compressor startup condition.

According to the centrifugal chiller, the oil pump starts prior to the startup of the compressor, and in the case where the oil supply differential pressure satisfies the compressor startup condition when the reference period elapses from the startup of the oil pump, the compressor starts. Meanwhile, in the case where the oil supply differential pressure does not satisfy the compressor startup condition, the compressor does not start, and the oil pump is further operated continuously. In this way, in the case where the compressor startup condition is not satisfied when the reference period elapses, the oil pump does not stop and is continuously operated. Accordingly, oil in the oil tank can continuously circulate to the compressor, and bubbles of the refrigerant gas which appears in the oil can be eliminated continuously. Therefore, for example, compared to a case of a retry in which the oil pump is temporarily stopped when the reference period elapses and restarted, the oil in the oil tank can be efficiently stirred, and the compressor can start at an early stage. Furthermore, in the case of the retry, it is necessary to calculate an appropriate start/stop interval of the oil pump according to an occurrence state of foaming. However, according to the centrifugal chiller, it is not necessary to calculate the start/stop interval.

In the centrifugal chiller, in a case where the oil supply differential pressure satisfies the compressor startup condition during an extended operation period when the extended operation of the oil pump is performed, the compressor may start.

According to the centrifugal chiller, during the extended operation period, the compressor can start when the oil supply differential pressure satisfies the compressor startup condition without waiting for the ending of the extended operation period.

In the centrifugal chiller, the control unit may notify of an abnormality without starting the compressor in a case where the oil supply differential pressure does not satisfy the compressor startup condition even when the extended operation period elapses.

In the centrifugal chiller, the control unit may set or adjust the extended operation period based on at least one of a pressure in the centrifugal chiller and a housing temperature of the condenser.

According to the centrifugal chiller, the extended operation period is set or adjusted based on at least one of the pressure in the centrifugal chiller and the housing temperature of the condenser. Accordingly, an appropriate extended operation period can be used according to an occurrence situation of the foaming.

In the centrifugal chiller, the control unit may set or adjust the reference period based on at least one of a pressure in the centrifugal chiller and a housing temperature of the condenser.

According to the centrifugal chiller, the reference period is set or adjusted based on at least one of the pressure in the centrifugal chiller and the housing temperature of the condenser. Accordingly, an appropriate reference period can be used according to the occurrence situation of the foaming.

According to a second aspect of the present invention, there is provided A startup control method for a centrifugal chiller including a compressor which compresses a refrigerant, a condenser which condenses the refrigerant compressed by the compressor, an expansion valve which expands a liquid refrigerant introduced from the condenser, an evaporator which evaporates the refrigerant expanded by the expansion valve, an oil tank which stores a lubricant to be supplied to the compressor, and an oil pump which supplies the lubricant in the oil tank to the compressor, the method comprising: starting the oil pump before the compressor start; and starting the compressor in a case where an oil supply differential pressure which is a differential pressure between an inlet-side pressure of the compressor and a pressure in the oil tank satisfies a compressor startup condition and extending an operation of the oil pump for a predetermined period without starting the compressor in a case where the oil supply differential pressure does not satisfy the compressor startup condition, when a reference period elapses from the startup of the oil pump.

Advantageous Effects of Invention

According to the aspects of the present invention, it is possible to reduce an influence on the compressor due to the occurrence of the foaming in the oil tank.

DESCRIPTION OF EMBODIMENTS

Hereinafter, a centrifugal chiller and a startup control method therefor according to an embodiment of the present invention will be described with reference to the drawings.

Figure 1:
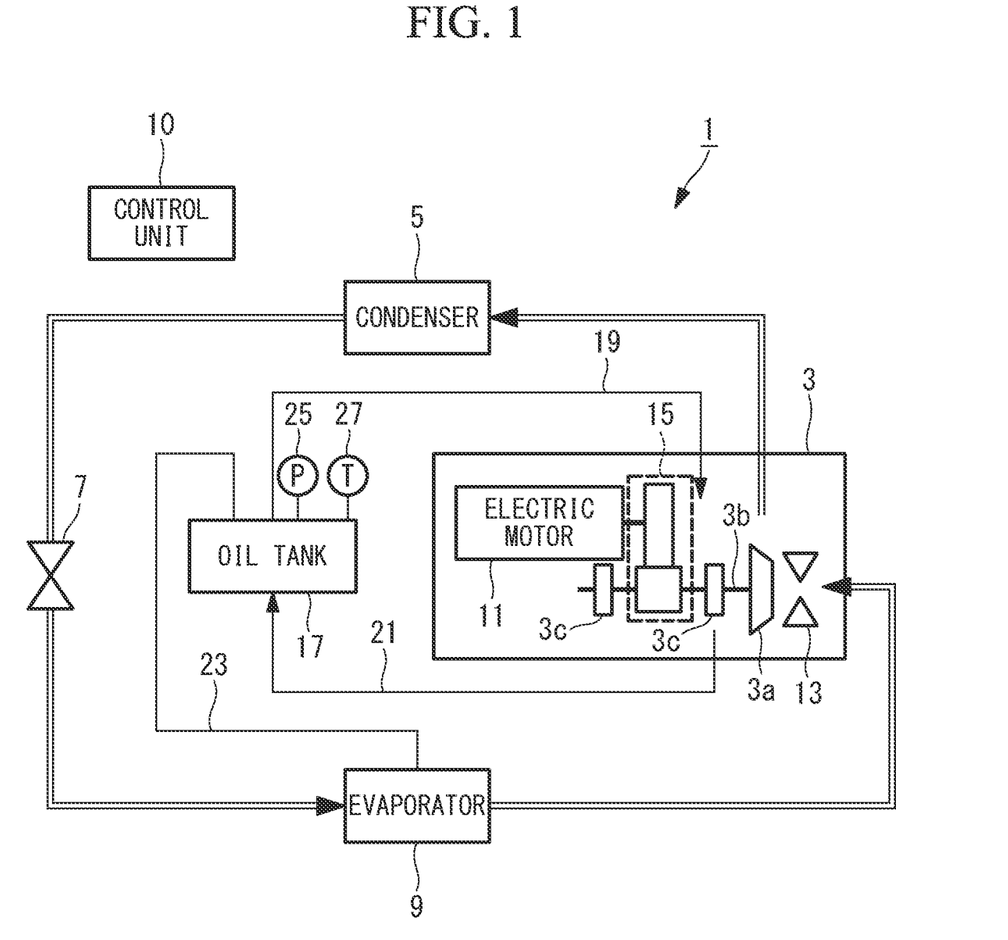
FIG. 1 is a schematic configuration diagram illustrating a centrifugal chiller according to an embodiment of the present invention.

FIG. 1 is a schematic configuration diagram illustrating the centrifugal chiller according to the embodiment of the present invention.

As illustrated in FIG. 1, a centrifugal chiller 1 includes a compressor 3 which compresses a refrigerant, a condenser 5 which condenses a high-temperature and high-pressure gas refrigerant compressed by the compressor 3, an expansion valve 7 which expands a liquid refrigerant introduced from the condenser 5, an evaporator 9 which evaporates the liquid refrigerant expanded by the expansion valve 7, and a control unit 10 which controls the centrifugal chiller 1.

As the refrigerant, a low-pressure refrigerant referred to as HFO-1233zd (E) is used.

For example, the compressor 3 is a turbo compressor, and as the compressor 3, a centrifugal compressor is used. The compressor 3 is driven by an electric motor 11 of which a rotating speed is controlled by an inverter. An output of the inverter is controlled by a control unit 10. An inlet guide vane (hereinafter, referred to as "IGV") 13 which controls a flow rate of a sucked refrigerant is provided in a refrigerant intake port of the turbo compressor 3, and thus, capacity of the centrifugal chiller 1 can be controlled by the IGV 13. An opening degree of the IGV 13 is controlled by the control unit 10.

The turbo compressor 3 includes an impeller 3a which rotates around a rotary shaft 3b. Rotational power is transmitted from the electric motor 11 to the rotary shaft 3b via a speed-increasing gear 15. The rotary shaft 3b is supported by a bearing 3c.

The condenser 5 is a shell and tube type heat exchanger or a plate type heat exchanger. Cooling water for cooling the refrigerant is supplied to the condenser 5. Heat of the cooling water introduced to the condenser 5 is discharged to the outside by a cooling tower (not illustrated) or an air heat exchanger (not illustrated), and thereafter, the cooling water is introduced to the condenser 5 again.

The expansion valve 7 is an electric expansion valve, and an opening degree of the expansion valve 7 is set by the control unit 10.

The evaporator 9 is a shell and tube type evaporator or a plate type heat exchanger. Chilled water supplied to an external load (not illustrated) is introduced to the evaporator 9. The chilled water is cooled to a rated temperature (for example, 7° C.) by heat exchange between the chilled water and the refrigerant in the evaporator 9, and is fed to the external load.

The lubricant is supplied from the oil tank 17 to the bearing 3c of the turbo compressor 3 or the speed-increasing gear 15. For example, as the lubricant, a mineral oil having a viscosity grade of 100 is used.

An oil pump 20 (refer to FIG. 2) is provided in the oil tank 17, and thus, the lubricant is supplied through an oil supply pipe 19 at a predetermined flow rate. The lubricant which has lubricated the inside of the compressor 3 is returned to the oil tank 17 via an oil return pipe 21.

A pressure equalizing pipe 23 which communicates with a portion between the oil tank 17 and the evaporator 9 is provided between the oil tank 17 and the evaporator 9 to equalize a pressure in the oil tank 17 and a pressure in the evaporator 9. In this way, the pressure in the oil tank 17 decreases, and thus, a refrigerant dissolution amount with respect to the lubricant is kept low.

A pressure sensor 25 and a temperature sensor 27 are provided in the oil tank 17. The pressure in the oil tank is measured by the pressure sensor 25 and the temperature (specifically, the temperature of the lubricant) in the oil tank 17 is measured by the temperature sensor 27 are sent to the control unit 10.

For example, the control unit 10 is configured to include a Central Processing Unit (CPU), a Random Access Memory (RAM), a Read Only Memory (ROM), a computer readable storage medium, or the like. For example, a series of processing for the control unit 10 to realize various functions is stored in a storage medium or the like in the form of a program (for example, a startup control program), and the CPU causes a RAM or the like to read the program and executes information processing/calculation processing to realize various functions. In addition, the program may be installed in the ROM or other storage medium in advance, may be provided in a state of being stored in a computer readable storage medium, or may be delivered via wired or wireless communication means. The computer-readable storage medium is a magnetic disk, a magneto-optical disk, a CD-ROM, a DVD-ROM, a semiconductor memory, or the like.

Figure 2:
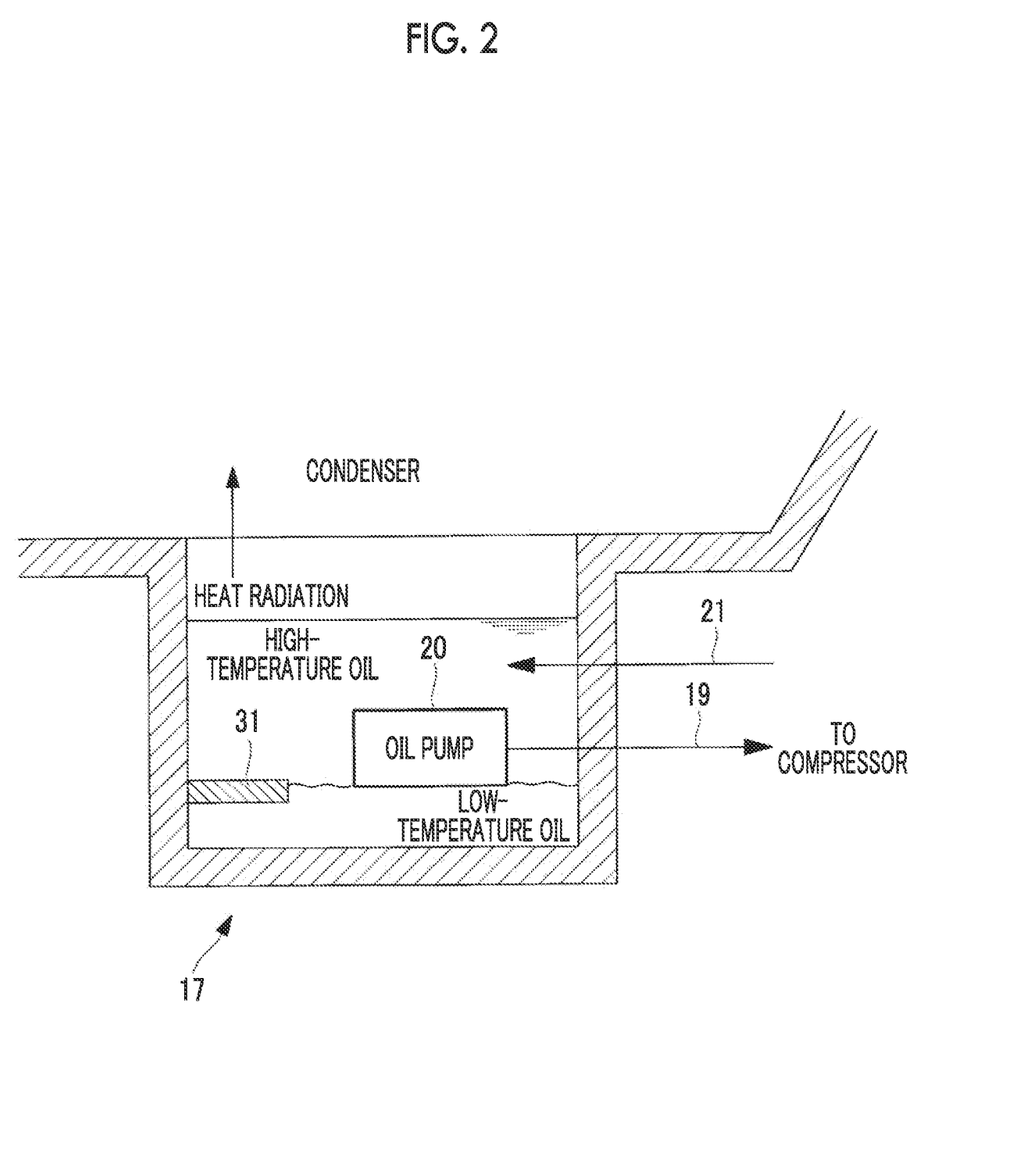
FIG. 2 is a diagram schematically illustrating a configuration of an oil tank according to an embodiment of the present invention.

FIG. 2 is a diagram schematically illustrating a configuration of the oil tank 17. As illustrated in FIG. 2, an oil heater 31 for heating lubricant stored in the oil tank 17 is provided in the oil tank 17. ON/OFF of the oil heater 31 is controlled by the control unit 10 so that the lubricant in the oil tank has a substantially constant temperature, based on the temperature measured by the temperature sensor 27.

The condenser 5 is disposed on an upper surface of the oil tank 17, and the heat of the oil tank 17 is radiated to a housing side of the condenser 5.

For example, the oil heater 31 is provided at a position separated from the bottom surface of the oil tank by a predetermined distance upward. Since the oil heater 31 is provided at the position, the lubricant having a relatively low temperature stays in a region below the installation position of the oil heater 31, and the lubricant having a relatively high temperature stays in a region above the installation position of the oil heater 31. This temperature distribution of the lubricant appears every time the oil heater 31 starts and stops.

When the oil pump 20 starts, foaming is likely to occur due to various factors such as a pressure reduction speed on a low-pressure side and the temperature distribution of lubricant in the oil tank 17 described above. For example, as described above, in a case where the temperature distribution of the lubricant is large, the lubricant having a relatively high temperature and the lubricant having a relatively low temperature come into contact with each other in the vicinity of an intake port of the oil pump 20, and thus, a refrigerant gas appears.

According to a startup control of the centrifugal chiller 1 of the present embodiment, the oil pump 20 starts prior to the startup of the compressor 3 to stir the lubricant, bubbles of the refrigerant gas which has appeared in the lubricant are eliminated, and an influence on the compressor 3 due to the foaming after the startup of the compressor is reduced.

Figure 3:
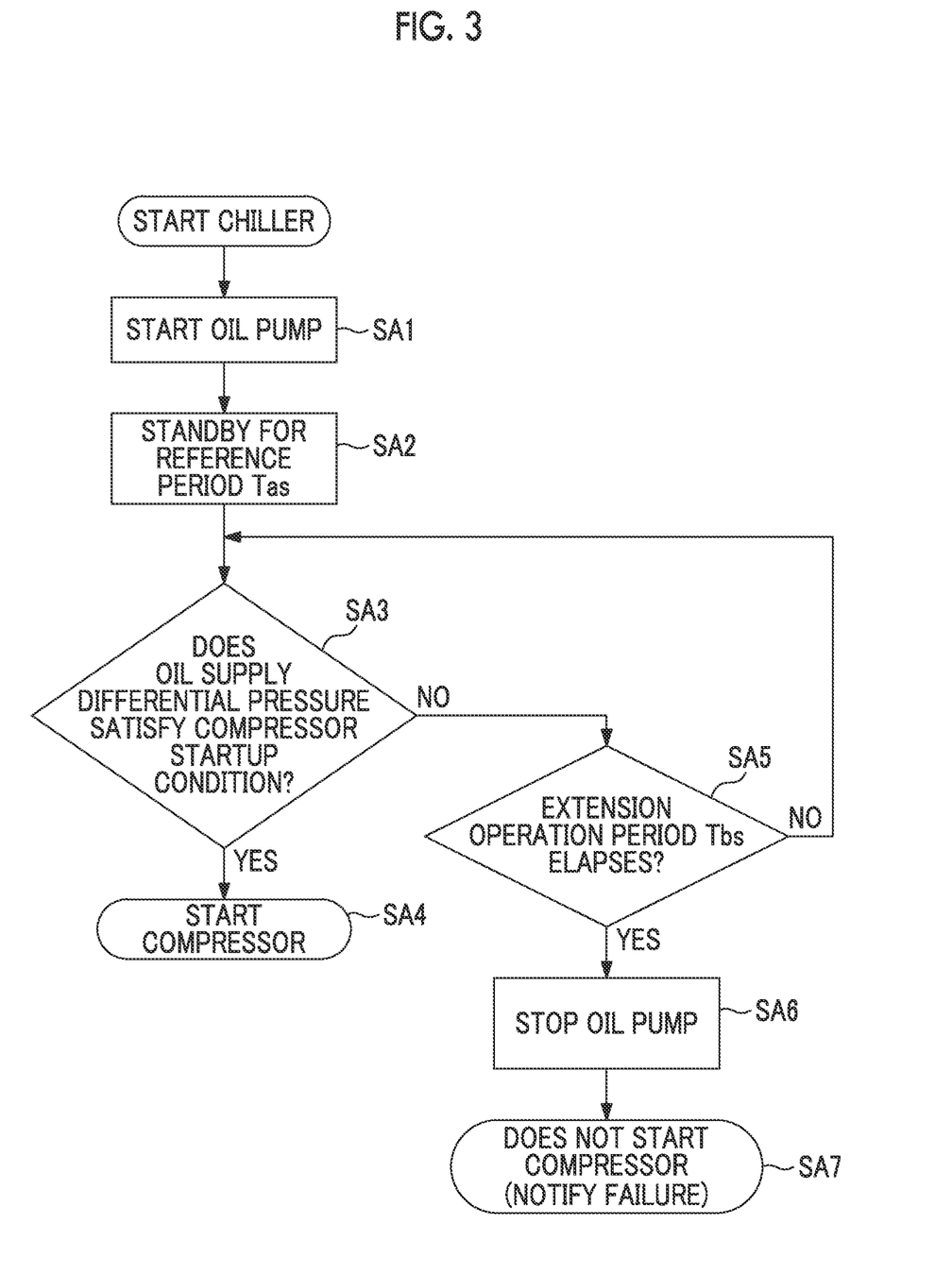
FIG. 3 is a flowchart illustrating a startup control of a centrifugal chiller according to an embodiment of the present invention.

Hereinafter, the startup control of the centrifugal chiller 1 according to the present embodiment will be described with reference to FIG. 3. FIG. 3 is a flowchart illustrating the startup control of the centrifugal chiller according to the present embodiment.

First, when the centrifugal chiller 1 starts, the oil pump 20 starts alone prior to the startup of the compressor 3 (Step SA1), and in this state, a standby state is set until a preset reference period Tas elapses (Step SA2). When the oil pump 20 starts, the lubricant in the oil tank 17 is sucked by the oil pump 20 and supplied to the stopped compressor 3 via the oil supply pipe 19. Further, the lubricant is returned from the stopped compressor 3 to the oil tank 17 via the oil return pipe 21 again. The lubricant circulates, and thus, the bubbles of the refrigerant gas that has appeared on the lubricant can be eliminated.

For example, preferably, the reference period Tas is set to be longer than a time required until all the lubricant stored in the oil tank 17 is sucked by the oil pump 20 and returned to the oil tank 17 via the compressor 3. Accordingly, the lubricant stored in the oil tank 17 is stirred, and the temperature distribution can be uniformized. As a result, it is possible to suppress an occurrence of the subsequent foaming.

Next, if the reference period Tas has elapsed from the startup of the oil pump 20, it is determined whether or not the oil supply differential pressure P satisfies a preset compressor startup condition (Step SA3). Here, the oil supply differential pressure P is a differential pressure between an inlet-side pressure in the compressor and a pressure (in other words, a pressure in the evaporator) in the oil tank 17. For example, the pressure on the inlet side of the compressor 3 is measured by a pressure sensor (not illustrated) provided on a suction side of the compressor 3. Moreover, for example, the pressure in the oil tank 17 is a pressure measured by the pressure sensor 25. The oil supply differential pressure P is calculated using a value measured by the pressure sensor.

For example, in a state in which the refrigerant gas appears in the lubricant, the gas is caught in the oil pump 20, and thus, the oil supply differential pressure P does not reach a specified pressure Po. Whether or not the oil supply differential pressure P has reached the specified pressure Po is determined, and thus, it is possible to determine whether or not bubbles of the refrigerant gas have appeared in the lubricant.

An example of the compressor startup condition is whether or not a state in which the oil supply differential pressure P is equal to or higher than the preset specified pressure Po continues for a predetermined period To or more. Moreover, the predetermined period To is set to a period shorter than the reference period Tas.

In a case where a determination result in Step SA3 is affirmative, the compressor 3 starts (Step SA4). Meanwhile, in a case where the determination result in Step SA3 is negative, there is a possibility that the foaming occurs in the lubricant, and thus, the operation of the oil pump 20 extends for a predetermined period. Subsequently, it is determined whether or not an extended operation period Tbs elapses (Step SA5). Here, for example, the extended operation period Tbs is set to a period in which there is no possibility that the lubricant may enter the evaporator. If the oil pump 20 is operated alone for a long time, there is a concern that the lubricant enters the evaporator 9, and in this case, the lubricant is attached to a heat transfer surface, and heat exchange performance is reduced. In the present embodiment, the extended operation period Tbs is set to the same time as the reference period Tas. However, the extended operation period Tbs can be set as appropriate within a range in which a long-term single operation of the oil pump 20 does not affect other configurations.

Subsequently, if a determination result in Step SA5 is negative, the processing returns to Step SA3 and determines again whether or not the oil supply differential pressure P satisfies the compressor startup condition. In addition, in a case where the oil supply differential pressure P satisfies the compressor startup condition until the extended operation period Tbs elapses, the processing proceeds from Step SA3 to Step SA4 to start the compressor 3. That is, during the extended operation period Tbs, unlike the above-described reference period Tas, the compressor 3 starts when the oil supply differential pressure P satisfies the compressor startup condition without waiting for the ending of the extended operation period.

Meanwhile, in a case where the oil supply differential pressure P does not satisfy the compressor startup condition until the extended operation period Tbs elapses, the oil pump 20 stops (Step SA6) and a failure is notified without starting the compressor 3 (Step SA7).

Figure 4:
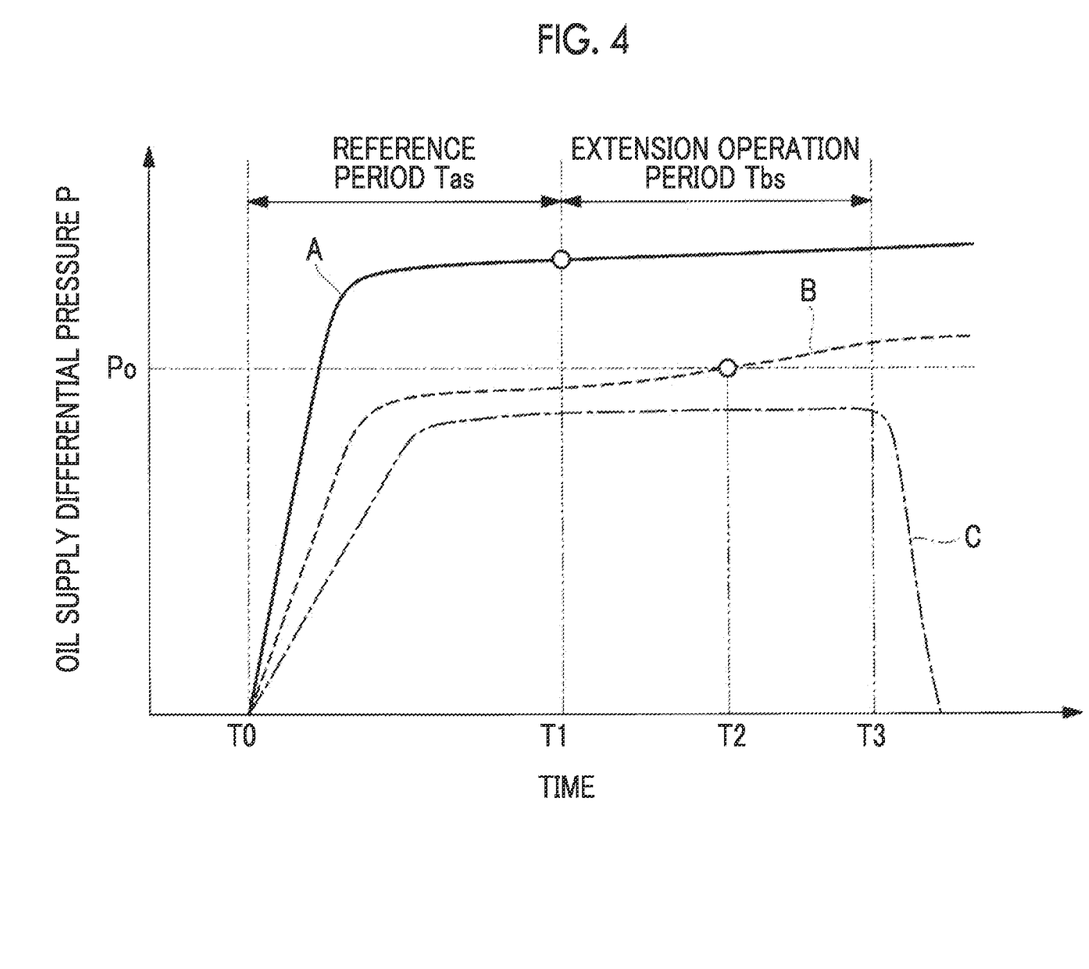
FIG. 4 is a graph illustrating a startup timing of a compressor with respect to a behavior of an oil supply differential pressure after the oil pump starts.

FIG. 4 is a graph illustrating a startup timing of the compressor 3 with respect to a behavior of the oil supply differential pressure P after the oil pump 20 starts.

For example, in a case of a behavior A illustrated in FIG. 4, before the reference period Tas elapses from the startup (time T0) of the oil pump 20, a state where the oil supply differential pressure P is equal to or more than the specified pressure Po is already maintained. Therefore, when the reference period Tas elapses (time T1), the compressor 3 starts immediately.

In a behavior B of FIG. 4, the oil supply differential pressure P does not reach a predetermined value even when the reference period Tas elapses from the startup of the oil pump 20. Accordingly, the operation of the oil pump 20 is continued. Moreover, if the oil supply differential pressure P satisfies the compressor startup condition at the time T2, thereafter, the compressor 3 starts immediately.

In a behavior C of FIG. 4, even when the extended operation period Tbs elapses, the oil supply differential pressure P does not reach a predetermined value and does not satisfy the compressor startup condition. Therefore, after the extended operation period Tbs elapses (time T3), the oil pump 20 stops immediately. Accordingly, the compressor 3 does not start and the failure is notified.

As described above, according to the centrifugal chiller 1 and the startup control method therefor of the present embodiment, the oil pump 20 starts prior to the startup of the compressor 3, and in the case where the oil supply differential pressure P satisfies the compressor startup condition when the reference period Tas elapses from the startup of the oil pump 20, the compressor 3 starts. Meanwhile, in the case where the oil supply differential pressure P does not satisfy the compressor startup condition, the compressor 3 does not start, and the operation of the oil pump 20 extends. In this way, in the case where the compressor startup condition is not satisfied when the reference period Tas elapses, the oil pump 20 does not stop and is continuously operated. Accordingly, the lubricant in the oil tank 17 can continuously circulate to the compressor 3, and the bubbles of the refrigerant gas which appears in the lubricant can be eliminated continuously. Therefore, for example, compared to a case of a retry in which the oil pump 20 is temporarily stopped when the reference period Tas elapses and restarted, the lubricant in the oil tank 17 can be efficiently stirred, and the compressor 3 can start at an early stage. Furthermore, in the case of the retry, it is necessary to calculate an appropriate start/stop interval of the oil pump 20 according to an occurrence state of foaming. However, according to the centrifugal chiller and the starting method therefor of the present embodiment, it is not necessary to calculate the start/stop interval.

Moreover, in the extended operation period Tbs, the compressor 3 starts immediately when the oil supply differential pressure P satisfies the compressor startup condition. Accordingly, compared to a case where the startup of the compressor 3 waits until the extended operation period Tbs ends, the compressor 3 can start at an early stage.

Moreover, in the present embodiment, the reference period Tas and the extended operation period Tbs are described as fixed preset periods. However, a length of at least one of the reference period Tas and the extended operation period Tbs may be adjusted based on at least one of a housing temperature of the condenser 5 and a pressure in the chiller. In addition, the length of at least one of the reference period Tas and the extended operation period Tbs may be set each time based on at least one of the housing temperature of the condenser 5 and the pressure in the chiller.

For example, as the housing temperature of the condenser 5 decreases, in other words, as an ambient temperature decreases, the heat radiation from the oil tank 17 to the condenser 5 increases, the oil temperature on the bottom surface of the oil tank 17 decreases, and an appearance mass of the refrigerant gas increases. Therefore, preferably, as the housing temperature of the condenser 5 decreases, the reference period Tas or the extended operation period Tbs may be made longer.

Moreover, as the pressure in the chiller decreases, a specific volume of the refrigerant gas increases. Therefore, preferably, as the pressure in the chiller decreases, the reference period Tas or the extended operation period Tbs are be made longer.

In the present embodiment, HFO-1233zd (E) is described as an example of the low-pressure refrigerant. However, the present invention can be applied to other low-pressure refrigerants, and in a case where there is a concern that the foaming occurs in the oil tank, the present invention can be applied to a high-pressure refrigerant.

REFERENCE SIGNS LIST

1: centrifugal chiller
3: Compressor
5: condenser
9: evaporator
10: control unit
17: oil tank
19: oil supply pipe
20: oil pump
21: oil return pipe
31: oil heater

The invention claimed is:
1. A centrifugal chiller comprising:
a compressor which compresses a refrigerant;
a condenser which condenses the refrigerant compressed by the compressor;
an expansion valve which expands a liquid refrigerant introduced from the condenser;
an evaporator which evaporates the refrigerant expanded by the expansion valve;
an oil tank which stores a lubricant to be supplied to the compressor;
an oil pump which supplies the lubricant in the oil tank to the compressor; and
a control unit which controls the oil pump,
wherein the control unit includes
a processor, and
a memory storing a program that, when executed by the processor, causes the processor to perform operations, the operations including,
starting the oil pump before the compressor starts, when a reference period elapses from the startup of the oil pump, starting the compressor in a case where an oil supply differential pressure which is a differential pressure between an inlet-side pressure of the compressor and a pressure in the oil tank satisfies a compressor startup condition and extending an operation of the oil pump for a predetermined period without starting the compressor in a case where the oil supply differential pressure does not satisfy the compressor startup condition.

2. The centrifugal chiller according to claim 1, wherein in a case where the oil supply differential pressure satisfies the compressor startup condition during the predetermined period when the extended operation of the oil pump is performed; the compressor starts.

3. The centrifugal chiller according to claim 2, wherein the control unit notifies of an abnormality without starting the compressor in a case where the oil supply differential pressure does not satisfy the compressor startup condition even when the predetermined period elapses.

4. The centrifugal chiller according to claim 2, wherein the control unit sets or adjusts the predetermined period based on at least one of a pressure in the centrifugal chiller and a housing temperature of the condenser.

5. The centrifugal chiller according to claim 1, wherein the control unit sets or adjusts the reference period based on at least one of a pressure in the centrifugal chiller and a housing temperature of the condenser.

6. A startup control method for a centrifugal chiller including a compressor which compresses a refrigerant, a condenser which condenses the refrigerant compressed by the compressor, an expansion valve which expands a liquid refrigerant introduced from the condenser, an evaporator which evaporates the refrigerant expanded by the expansion valve, an oil tank which stores a lubricant to be supplied to the compressor, and an oil pump which supplies the lubricant in the oil tank to the compressor, the method comprising:

starting the oil pump before starting the compressor; and starting the compressor in a case where an oil supply differential pressure which is a differential pressure between an inlet-side pressure of the compressor and a pressure in the oil tank satisfies a compressor startup condition and extending an operation of the oil pump for a predetermined period without starting the compressor in a case where the oil supply differential pressure does not satisfy the compressor startup condition, when a reference period elapses from the startup of the oil pump.

7. The centrifugal chiller according to claim 3, wherein the control unit sets or adjusts the predetermined period based on at least one of a pressure in the centrifugal chiller and a housing temperature of the condenser.

8. The centrifugal chiller according to claim 2, wherein the control unit sets or adjusts the reference period based on at least one of a pressure in the centrifugal chiller and a housing temperature of the condenser.

9. The centrifugal chiller according to claim 3, wherein the control unit sets or adjusts the reference period based on at least one of a pressure in the centrifugal chiller and a housing temperature of the condenser.

10. The centrifugal chiller according to claim 4, wherein the control unit sets or adjusts the reference period based on at least one of a pressure in the centrifugal chiller and a housing temperature of the condenser.

* * * * *